US005802850A

United States Patent [19]

Kimura

[11] Patent Number: 5,802,850

[45] Date of Patent: Sep. 8, 1998

[54] HYDRAULIC MACHINE HAVING AN IMPROVED AIR BAG

[75] Inventor: Kiyoshi Kimura, Fujisawa, Japan

[73] Assignee: Kabushiki Kaisha Ogura, Kanagawa-Ken, Japan

[21] Appl. No.: 813,075

[22] Filed: Mar. 7, 1997

[30] Foreign Application Priority Data

May 31, 1996 [JP] Japan .................................... 8-138230

[51] Int. Cl.[6] ...................................................... F16D 31/02

[52] U.S. Cl. ................................. 60/479; 60/325; 60/477

[58] Field of Search .............................. 60/325, 413, 477, 60/479

[56] References Cited

U.S. PATENT DOCUMENTS

| | | | |
|---|---|---|---|
| 4,031,619 | 6/1977 | Gregory | 60/477 X |
| 4,206,603 | 6/1980 | Mekler | 60/477 |
| 4,263,801 | 4/1981 | Gregory | 60/479 X |
| 4,689,957 | 9/1987 | Gallentine | 60/477 X |

*Primary Examiner*—Hoang Nguyen

*Attorney, Agent, or Firm*—Dickstein Shapiro Morin & Oshinsky LLP

[57] ABSTRACT

A portable punching machine is disclosed which has a hydraulic, single acting, spring return cylinder for linearly moving a punch toward and away from a die. The cylinder is driven in turn by a hydraulic pump disposed in a fluid chamber built into the machine. The pump fluid chamber is in constant communication with a fluid control chamber accommodating an elastic air bag capable of contraction and expansion for keeping constant the amount of hydraulic oil in the pump fluid chamber. Characteristically, a spacer of polyurethane foam or like elastic material is loosely inserted in the air bag in order to prevent the mutual contact of the inside surface of the bag, such contact being undesirable because the inside surface of the bag is customarily covered with a sticky parting agent that has been used in molding the bag from rubber.

6 Claims, 3 Drawing Sheets

HYDRAULIC MACHINE HAVING AN IMPROVED AIR BAG

BACKGROUND OF THE INVENTION

This invention relates generally to hydraulic machines of the type comprising a hydraulic cylinder having a piston, and a hydraulic pump for linearly moving the piston within the cylinder. More specifically, the invention pertains to hydraulic machines of the above general character that lend themselves to variety of punching operations such as boring, cutting, and bending. Still more specifically, the invention deals with improvements relating to an air bag which is customarily included in hydraulic punching machines or the like.

Portable, hydraulic punching machines have been known and used extensively for working on metal members. Such machines are more or less alike in that a punch is moved back and forth with respect to a fixed die for punching the work being held against the die. Typically, they integrally comprise a hydraulic cylinder of the single acting, spring return variety, a hydraulic pump for powering the cylinder, and an electric motor for driving the pump. Disposed in a fluid chamber, the pump pressurizes a fluid, normally hydraulic oil, for delivery to a cylinder fluid chamber. The piston of the cylinder is thus caused to travel on its power stroke against the force of the return spring, thereby thrusting the tool on the tip of the piston rod toward the fixed die.

Toward the end of the piston power stroke, a return valve opens to place the cylinder fluid chamber with the pump fluid chamber through a fluid return passageway. Thus the fluid returns to the pump fluid chamber as the piston subsequently travels back to its initial or normal position under the force of the return spring.

In order for the pump fluid chamber to be constantly filled with the fluid, regardless of the piston position with respect to the cylinder, a fluid control chamber is provided which is in direct, constant communication with the pump fluid chamber and which contains an air bag of rubber or like elastic material. Being in open communication with atmosphere, the air bag expands, drawing in the atmospheric air, when the fluid is pumped away from the pump fluid chamber during the piston power stroke, and contracts or collapses, expelling the air into the atmosphere, when the fluid flows back to the pump fluid chamber during the piston return stroke.

A problem was encountered in use of the hydraulic punching machines of the foregoing construction. The air bag collapses, as above, upon contraction of the cylinder and remains compressed to the full as long as the machine is left out of use, with the piston in the above normal position under the spring pressure.

Usually, the air bag is molded from rubber, and a parting agent is coated on the mold surfaces in order to expedite the withdrawal of the product from the mold. The parting agent, which is sticky, is left adhering to the inside surface of the air bag even after it has been mounted in position on the punching machine. Consequently, in the conventional machines, the inside surface of the air bag has been very likely to stick one part to another via the parting agent when it is left compressed, that is, when the machine is left unused, for any prolonged period of time. The air bag may stick so fast that it may fail to expand under atmospheric pressure when the machine is operated subsequently.

SUMMARY OF THE INVENTION

It is therefore among the objects of the present invention to assure, in hydraulic machines of the character defined, unfailing expansion of the air bag no matter how long it has been held compressed.

Briefly, the invention may be summarized as a hydraulic machine comprising a piston reciprocably mounted in cylinder housing means and defining a cylinder fluid chamber therein, a pump disposed in a pump fluid chamber for pressurizing a hydraulic fluid for delivery to the cylinder fluid chamber, an elastic air bag disposed in a fluid control chamber which is in constant communication with the pump fluid chamber, the air bag being capable of contraction and expansion in order to keep constant the amount of the fluid in the pump fluid chamber, and a spacer received within the air bag for preventing the mutual contact of the inside surface of the air bag upon contraction.

As the spacer prevents the mutual contact of the inside surface of the air bag, the bag will readily expand when the machine is operated, no matter how long it has been left out of operation.

Preferably, the spacer is of elastic material. The elasticity of the spacer assures the full contraction of the air bag, as the spacer itself contracts with the bag, and the positive expansion thereof as the spacer aids in the bag expansion under atmospheric pressure. Particularly preferred air bag materials are plastic foams as typified by polyurethane foam. Spacers molded from these materials have been confirmed to possess required degrees of elasticity, performing their intended functions to the full.

In a preferred embodiment of the invention the air bag is tubular in shape, closed at one end and open at the other, and the spacer is in the shape of a cylinder. Loosely received in the air bag, the spacer does not interfere with the contraction of the bag in any direction but does effectively help the bag regain its shape.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENT

Figure 1:
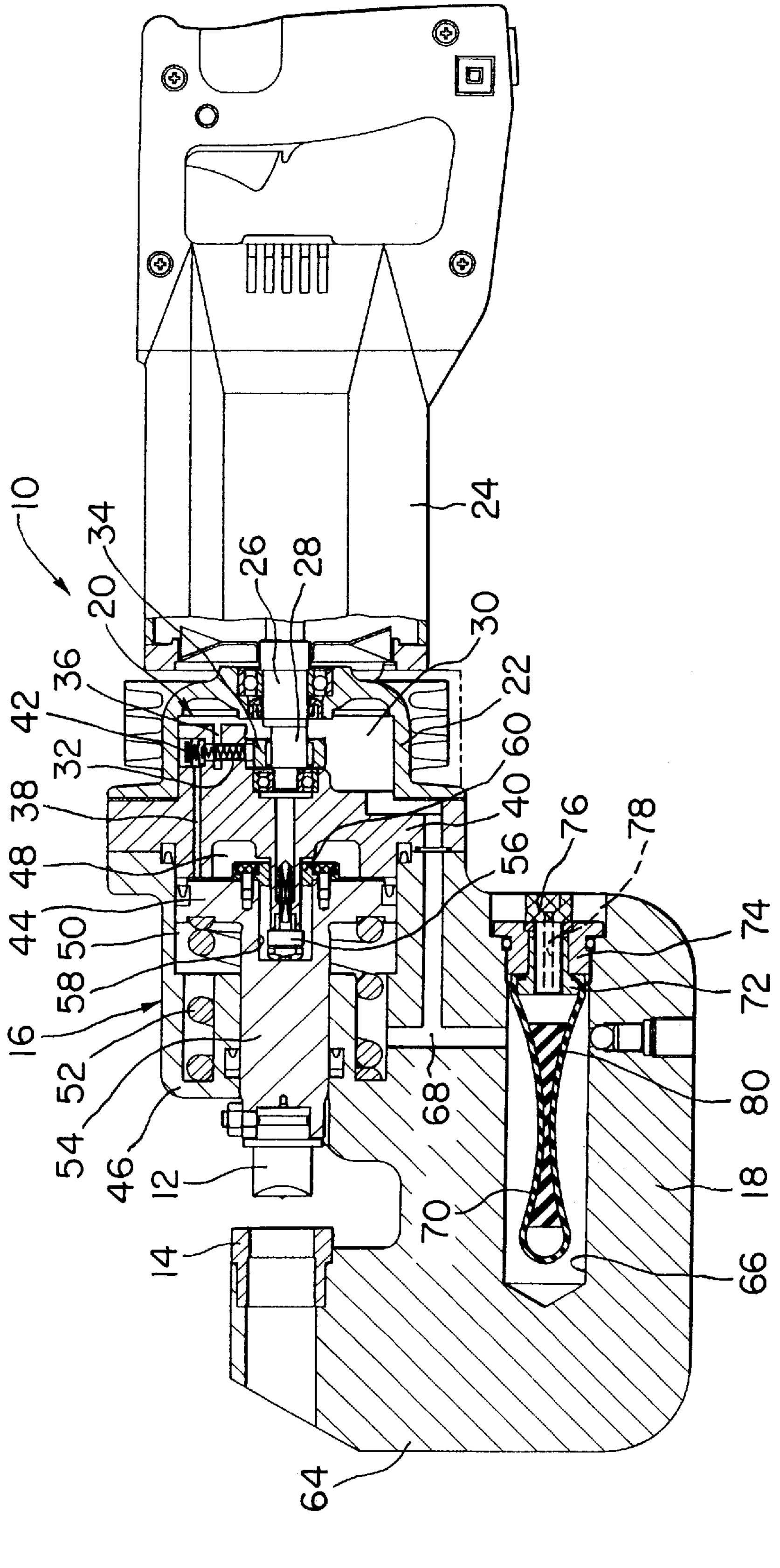
FIG. 1 is a partial section through the portable, hydraulic punching machine constructed in accordance with the novel concepts of the present invention, the machine being shown adapted for creating holes in metal work and here shown in its normal state, with the air bag compressed under hydraulic fluid pressure.
Figure 2:
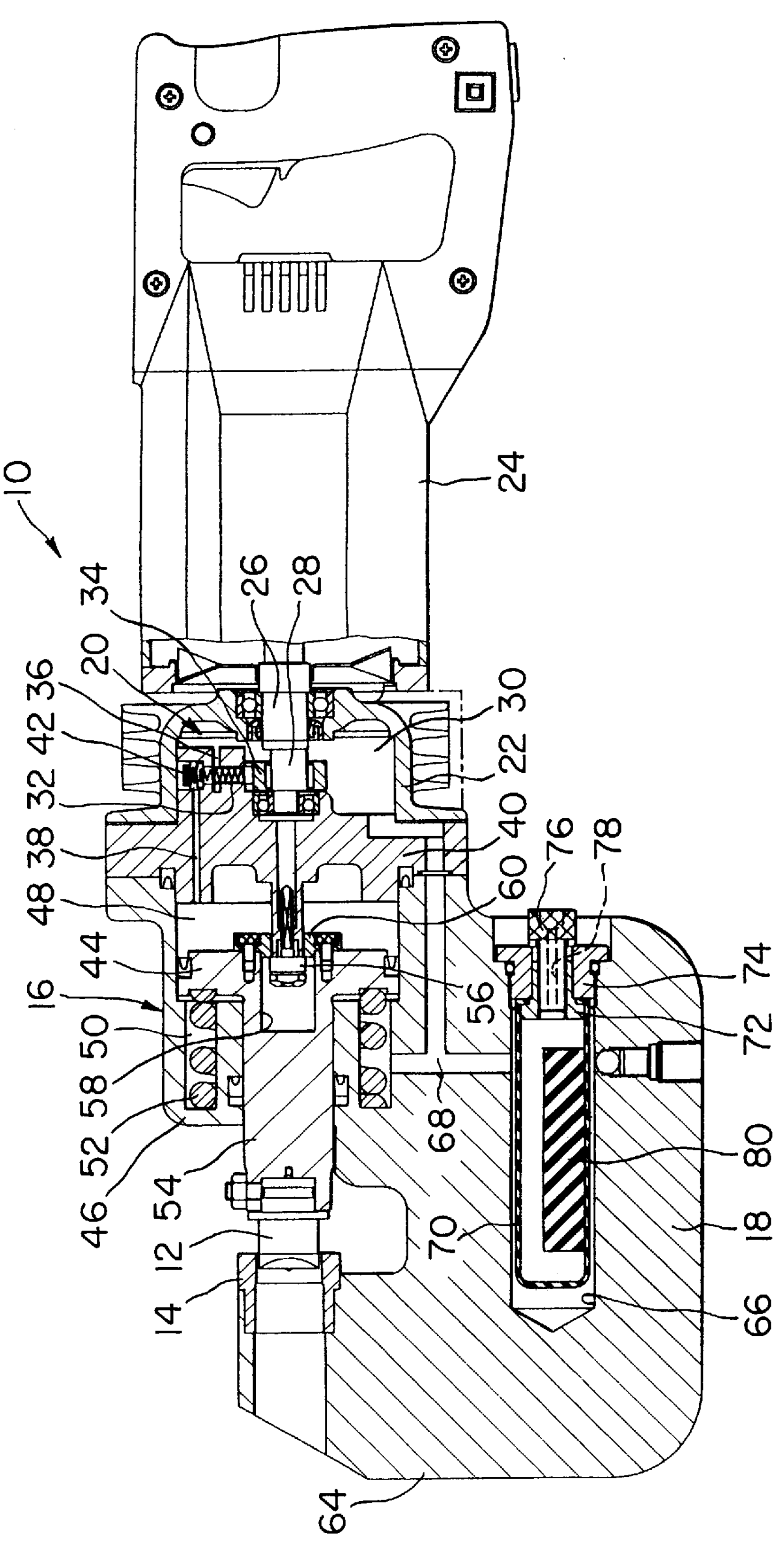
FIG. 2 is a view similar to FIG. 1 except that the machine is shown in the act of punching, with the air bag expanded under atmospheric air pressure.

The general construction of the representative punching machine according to the present invention will be understood from a consideration of FIGS. 1 and 2. Generally designated 10, the punching machine is therein shown to have a punch 12 for cutting a hole in metal work, not shown, in coaction with a die 14. FIG. 1 shows the punch 12 retracted away from the die 14, and FIG. 2 the punch thrust into the die.

Employed for driving the punch 12 back and forth is a hydraulic cylinder 16 of the familiar single acting, spring return type built into a body 18 of the punching machine 10. The hydraulic cylinder 16 is itself powered by a pump 20 having a housing 22 mounted to the rear end, shown directed to the right in FIGS. 1 and 2, of the body 18. The hydraulic pump 20 is driven in turn by an electric motor 24 mounted further on the back of the pump housing 22.

The drive motor 24 has an armature shaft 26 rotatably extending through the rear end wall of the pump housing 22 and terminating in an eccentric pump drive cam 28. This pump drive cam is disposed in a hydraulic fluid chamber 30 within the pump housing 22 which is to be filled with a hydraulic fluid such as oil.

The pump 20 comprises a plurality of pump cylinders 32, one seen, of radical arrangement around the drive cam 28, and a plurality of pump pistons 34 slidably received one in each pump cylinder. Each pump cylinder has a fluid intake port 36 open to the pump fluid chamber 30 and communicates with a fluid supply passageway 38 extending through a wall 40 toward the hydraulic cylinder 16. A check valve 42 is provided between each pump cylinder 32 and one fluid passageway 38 associated therewith. The pump pistons 34 are all driven by the drive cam 28 for reciprocation in the pump cylinders 32, thereby pressurizing the fluid for delivery to the hydraulic cylinder 16 via the passageways 38.

The hydraulic cylinder 16 has a piston 44 slidably mounted in a cylinder housing 46 formed in one piece with the body 18. The piston 44 divides the interior of the cylinder housing 46 into a fluid chamber 48 and a spring chamber 50. The cylinder fluid chamber 48 communicates with the pump 20 by way of the fluid supply passageways 38. The spring chamber 50 accommodates a return spring shown as a helical compression spring 52. Formed in one piece with the cylinder piston 44, a piston rod 54 pressure-tightly extends through, and projects outwardly of, the front wall of the cylinder housing 46 and has the punch 12 keyed to its front end.

Thus, normally held in the FIG. 1 position under the influence of the return spring 52, the cylinder piston 44 together with the piston rod 54 will be thrust forwardly on its power stroke to the FIG. 2 position by the pressurized fluid from the pump 20. Then, upon withdrawal of the fluid from the cylinder fluid chamber 48, in a manner yet to be described, the cylinder piston 44 will be retracted to the FIG. 1 position by the return spring 52.

A return valve 56 is disposed in a hollow 58 formed in the cylinder piston 44 for returning the hydraulic fluid from cylinder fluid chamber 48 back into pump fluid chamber 30. Normally, or when the cylinder piston 44 is in the FIG. 1 position under the force of the return spring 52, the return valve 56 is closed, holding the cylinder fluid chamber 48 out of communication with the pump fluid chamber 30. Then, toward the end of the cylinder extension stroke, the return valve 56 will hit an abutment 60 fastened to the cylinder piston 44 and so open to admit the fluid to flow from cylinder fluid chamber 48 back to pump fluid chamber 30.

The machine body 18 is formed in one piece with a jaw 64 extending forwardly therefrom. The die 14 is replaceably mounted to this jaw 64, in a position opposite the punch 12 on the cylinder piston rod 54.

Formed in the jaw 64 is a fluid control chamber 66 which communicates with the pump fluid chamber 30 by way of a fluid passageway 68 as well as with the cylinder spring chamber 50. The fluid control chamber 66 accommodates an air bag 70 of rubber or like elastic material which is capable of elastic contraction, as in FIG. 1, and elastic re-expansion, as in FIG. 2, in order to keep constant the amount of the fluid in the pump fluid chamber 30.

Figure 3:
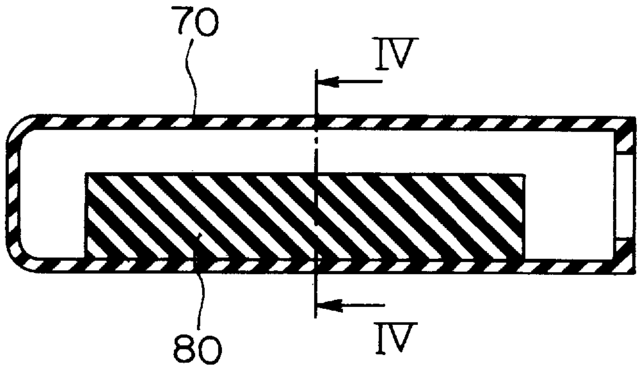
FIG. 3 is an enlarged section through the air bag with the spacer received therein.
Figure 4:
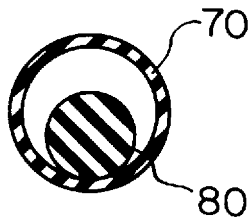
FIG. 4 is a section taken along the line IV—IV in FIG. 3.

As illustrated on an enlarged scale in FIGS. 3 and 4, the air bag 70 is tubular in shape, closed at one end and open at the other. The air bag 70 is received in the fluid control chamber 66 of matching shape and has its open end engaged between an inner ring 72 and an outer ring 74 which in turn are secured to each other by a screw member 76. The outer ring 74 is screw threadedly engaged with the jaw 64 in order to retain the air bag 70 in the fluid control chamber 66. So mounted to the machine 10, the air bag 70 is in open communication with the atmosphere via an air passageway 78 extending through the screw member 76.

According to a feature of the present invention, a spacer 80 is loosely received in the air bag 70 in order to prevent its inside surface from mutual contact upon contraction. Molded from elastic material such as plastic foams, polyurethane foam for the best results, the space is shown to be cylindrical in shape, with a diameter less than the inside diameter of the air bag 70 and a length less than that of the air bag. The spacer 80 is to be compressed with the air bag 70, as in FIG. 1, when the machine is out of operation or when the punch 12 is retracted away from the die 14.

Such being the construction of the punching machine 10 according to the present invention, the machine will normally in the state of FIG. 1, with the hydraulic cylinder 16 held contracted under the force of the return spring 52 to hold punch 12 away from the die 14. The work to be punched may be positioned between punch 12 and die 14.

The electric drive motor 24 may now be set into rotation. Driven by the eccentric cam 28 on the motor armature shaft 26, the pump pistons 34 will reciprocate within the pump cylinders 32 thereby pressurizing the hydraulic fluid in the pump fluid chamber 30 for delivery to the cylinder fluid chamber 48. The pressurized fluid on flowing into the cylinder fluid chamber 48 will force the piston 44 forwardly against the bias of the return spring 52 from its FIG. 1 position to that of FIG. 2. Thus thrust forwardly with the cylinder piston rod 54, the punch 12 will cut a hole in the work on the die 14.

Toward the end of the forward stroke of the cylinder piston 44, the return valve 56 will hit the abutment 60 on the cylinder piston 44. Thereupon the fluid will flow from cylinder fluid chamber 48 back into pump fluid chamber 30 as the cylinder piston 44 travels back to the FIG. 1 position under the bias of the return spring 52. The punch 12 will retract to the FIG. 1 position with the return stroke of the cylinder piston 44. One cycle of punching operation has now seen completed.

When the fluid under pressure is being supplied as above from pump fluid chamber 30 to cylinder fluid chamber 48 for punching the work, the pump fluid chamber 30 will draw in the fluid from the fluid control chamber 66 via the passageway 68. Consequently, as depicted in FIG. 2, the air bag 70 will be fully expanded, drawing in the atmospheric air via the passageway 78 in the screw member 76, upon full extension of the hydraulic cylinder 16.

Upon subsequent contraction of the cylinder 16 the fluid will flow back to the pump fluid chamber 30 thereby causing part of the fluid that has been contained in this chamber to flow back to the fluid control chamber 66. The result will be contraction of the air bag 70, as well as of the spacer 80 received therein, as pictured in FIG. 1.

Thus the air bag 70 will repeat the cycle of expansion and contraction with the repeated use of the punching machine 10. However, when the machine is left out of use for any extended period of time, the air bag 70 will remain compressed during that same period of time. If it were not for the spacer 80, the inside surface of the air bag 70 would then mutually contact and stick so fast via the residual parting agent that, in the worst case, the air bag would fail to expand in subsequent use of the machine.

No such trouble will occur thanks to the spacer 80 according to the present invention. The spacer 80 functions to prevent the mutual contact of the inside surface of the air bag 70 on contraction, assuring its smooth re-expansion no matter how long the machine 10 has been left unused. Moreover, during such air bag expansion, the spacer 80 by virtue of its own elasticity will help the air bag regain its intrinsic shape. It is also noteworthy that the spacer 80 of the representative cylindrical shape is equally effective to expedite air bag expansion whichever radial direction it has been collapsed in.

Although the present invention has been shown and described hereinbefore as applied to a portable punching machine, it is not desired that the invention be limited to this particular application because the principles of invention are applicable to a wide variety of hydraulic machines of the character defined. It is also understood that the illustrated embodiment admits various modifications or alterations within the usual knowledge of the specialists.

What is claimed is:

1. A hydraulic machine comprising:

(a) cylinder housing means;

(b) a piston reciprocably mounted in the cylinder housing means and defining a cylinder fluid chamber therein;

(c) pump housing means defining a pump fluid chamber for containing a hydraulic fluid;

(d) a pump disposed in the pump fluid chamber for pressurizing the fluid for delivery to the cylinder fluid chamber;

(e) means defining a fluid control chamber in constant communication with the pump fluid chamber;

(f) an elastic air bag disposed in the fluid control chamber, the air bag being capable of contraction and expansion in order to keep constant the amount of the fluid in the pump fluid chamber; and (g) a spacer received within the air bag for preventing the mutual contact of the inside surface of the air bag upon contraction.

2. The hydraulic machine of claim 1 wherein the spacer is of elastic material.

3. The hydraulic machine of claim 2 wherein the elastic material is a plastic foam.

4. The hydraulic machine of claim 3 wherein the plastic foam is polyurethane foam.

5. The hydraulic machine of claim 2 wherein the spacer is cylindrical in shape.

6. The hydraulic machine of claim 5 wherein the air bag is tubular in shape, closed at one end and open at another, with the spacer loosely received therein.

* * * * *